(12) United States Patent
Churchill et al.

(10) Patent No.: US 6,513,690 B1
(45) Date of Patent: Feb. 4, 2003

(54) SUPPLEMENTARY CARGO CARRIER FOR A VEHICLE

(76) Inventors: Michael P. Churchill, 1872 Camp St. Extension, Jamestown, NY (US) 14701; Robert W. Swartz, 2073 Buffalo St. Extension, Jamestown, NY (US) 14701

( * ) Notice: Subject to any disclaimer, the term of this patent is extended or adjusted under 35 U.S.C. 154(b) by 31 days.

(21) Appl. No.: 09/723,196

(22) Filed: Nov. 27, 2000

(51) Int. Cl.[7] ................................................ B60R 9/00
(52) U.S. Cl. ................ 224/498; 224/404; 224/495; 224/502; 224/518; 224/523; 224/524
(58) Field of Search ................ 224/498, 402, 224/403, 404, 405, 497, 492, 495, 502, 503, 504, 518, 519, 521, 522, 523, 524, 525, 526, 528, 530, 281; 414/462

(56) References Cited

U.S. PATENT DOCUMENTS

| | | | |
|---|---|---|---|
| 3,913,811 A | * 10/1975 | Spencer | 224/497 |
| 5,033,662 A | 7/1991 | Godin | |
| 5,116,096 A | 5/1992 | Taylor | |
| 5,224,636 A | * 7/1993 | Bounds | 224/281 |
| 5,328,225 A | 7/1994 | Melching et al. | |
| 5,375,773 A | 12/1994 | Lewis | |
| 5,501,500 A | 3/1996 | Cannon | |
| 5,658,033 A | * 8/1997 | Delaune | 224/402 |
| D407,135 S | 3/1999 | DeWitt | |
| 5,881,937 A | 3/1999 | Sadler | |
| 5,927,925 A | 7/1999 | Winkelmann | |
| 5,971,241 A | * 10/1999 | Allen et al. | 224/314 |
| D415,988 S | 11/1999 | Stearns | |
| 6,070,926 A | 6/2000 | Hardin | |
| 6,237,824 B1 | * 5/2001 | Bagley | 224/402 |

* cited by examiner

Primary Examiner—Stephen P. Garbe
Assistant Examiner—Maerena W. Brevard
(74) Attorney, Agent, or Firm—Stephen B. Salai, Esq.; Brian B. Shaw, Esq.; Harter, Secrest & Emery LLP

(57) ABSTRACT

A supplementary cargo carrier for a vehicle. The carrier includes a support-frame, a platform and support bars which can be pivoted relative to the platform. The support-frame can be removably attached to a trailer hitch. The carrier can have a variety of configurations depending on the intended application, the configurations being changeable by adjusting the support bars and by reversing the orientation of the platform relative to the support-frame.

31 Claims, 16 Drawing Sheets

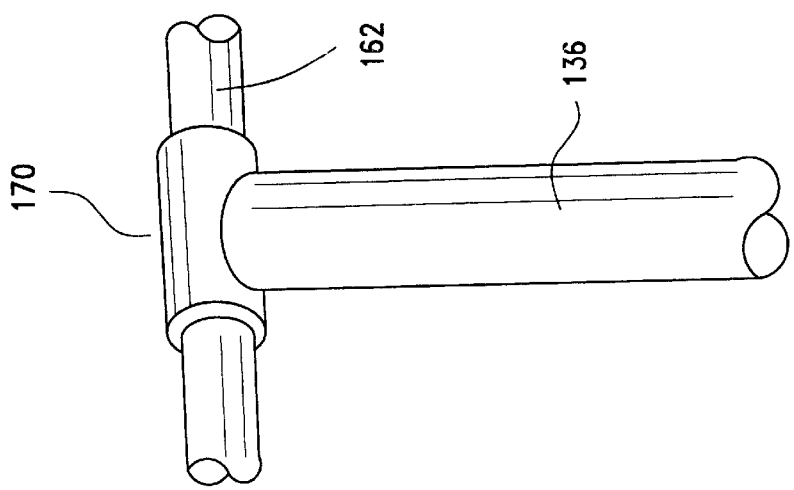
FIG. 9
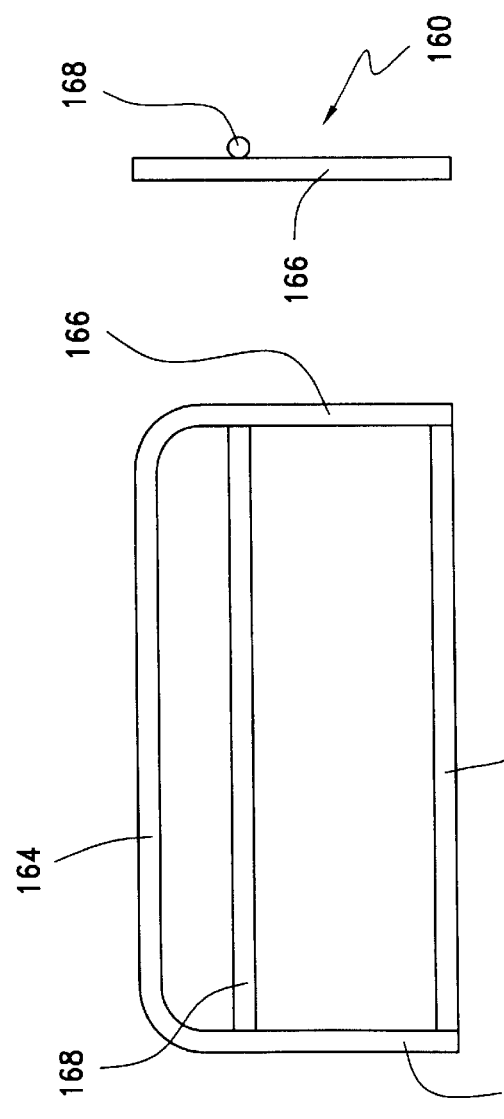
FIG. 8(b)
FIG. 8(a)

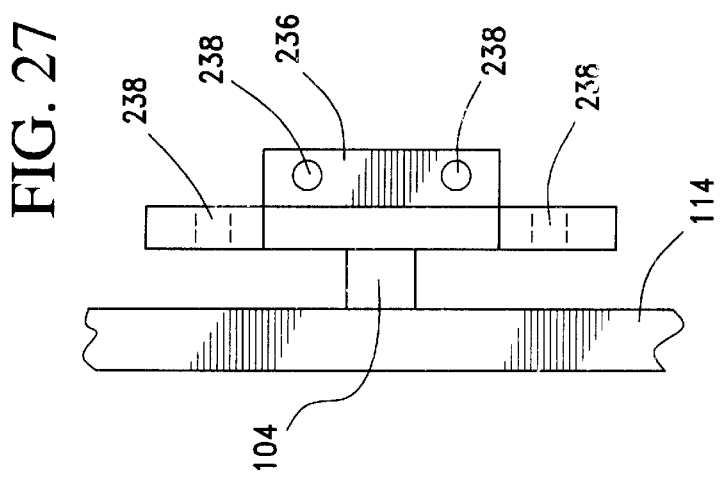
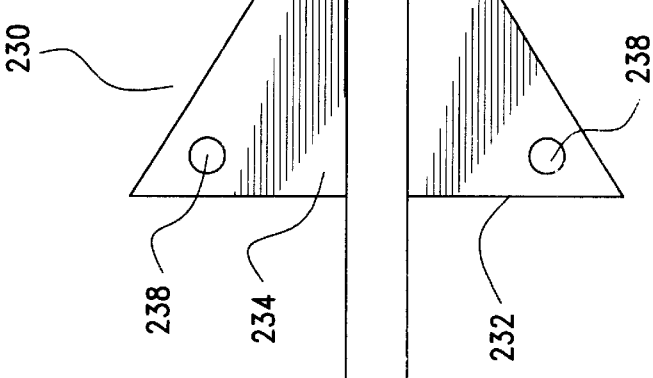
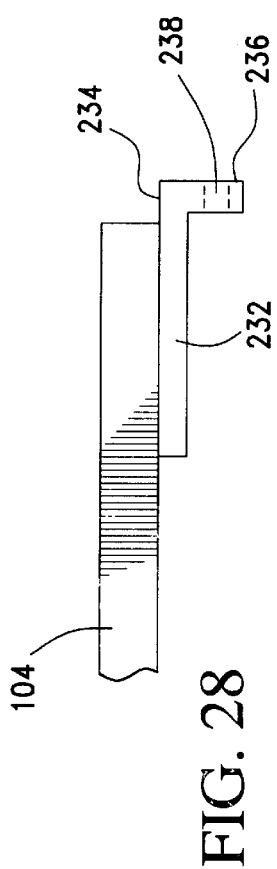

SUPPLEMENTARY CARGO CARRIER FOR A VEHICLE

FIELD OF THE INVENTION

The invention pertains to an cargo carrier for a motor vehicle, and in particular to an attachment compatible with a trailer hitch such as a Reese hitch, which can expand the cargo carrying capacity beyond the originally intended capacity of the vehicle.

BACKGROUND OF THE INVENTION

Vehicles having a drop-down type tailgate and a vehicle bed, such as pickup trucks and station wagons, are commonly used to transport large, often heavy, objects such as lumber, furniture, and machinery. In practice, such objects often exceed the length of the vehicle bed and when placed therein extend over the tailgate. Such a situation may result in an awkward load, a situation which is preferably avoided.

One solution to this problem is to provide a larger vehicle bed. However, increasing the length of the bed must be weighed against other vehicle design objectives, such as the desire to have a vehicle which is short enough, from front bumper to rear bumper, to fit into most garages and parking spaces.

Users of other vehicles such as sports utility vehicles and cars also may sometimes require additional space for carrying cargo. One solution to this problem is to provide a roof rack or carrier; however, this is often inconvenient.

Accordingly, it is an object of this invention to provide a supplemental structure that temporarily extends a vehicle bed for conveniently supporting cargo which cannot easily be supported by the vehicle bed alone.

It is a further object of this invention to provide a supplemental cargo structure that can be used with vehicles for carrying cargo in excess of the normal capacity of such vehicles.

It is a further object of this invention to provide a structure that can be easily mounted to and detached from the vehicle.

It is yet a further object of this invention to provide that the structure be easily configured for alternative uses and for alternative types of vehicle.

It is yet another object of the invention to provide for the convenient loading and unloading of wheeled cargo such as small tractors, lawn mowers and the like, or of normally immobile cargo such as furniture, using a wheeled moving device such as a dolly or a handcart.

BRIEF DESCRIPTION OF THE INVENTION

The cargo carrier of this invention includes a support-frame with a stem and a crossbar attached to the stem in the shape of a T. Two first support bars which are upright and tubular have upper ends extending to an adjustable height from the crossbar to an edge of a generally rectangular platform. The upright bars are pivotally connected to an edge of the platform, and may be adjusted so that the platform is at the same level as the truck bed. The pivotal connections allow a user to tilt the platform. The upright bars may be unitary and have a slidable relationship with the crossbar, or they may be telescopic having two portions which have a slidable relationship with each other.

One or more second support bars or inclined bars which are tubular and telescopic are pivotally connected to the crossbar, and can selectably extend rearwardly or forwardly therefrom at some chosen inclination. The inclined bars, typically two in number, are pivotally connected to the platform, preferably to a cross-member parallel to and spaced apart from the platform edge to which the upright bars connect. The perpendicular distance between the two inclined bars is preferably greater than that between the upright bars.

The combination of two sets of pivoting support bars, both of which are variably extendable from the crossbar, allows the user to alter the configuration of the platform from a horizontal bed extender to an inclined surface to a vertically oriented surface which can serve as a supplementary tailgate or just to stow the invention in a space saving manner when it is not otherwise in use.

Removable guards can extend upwards from the platform to help retain cargo in position and prevent cargo from falling off the bed.

BRIEF DESCRIPTION OF THE DRAWINGS

FIG. 8(*a*) is a plan view of a frame for a platform.

FIG. 8(*b*) is an end elevation of the frame.

FIG. 9 is a perspective view showing detail of a pivotal joint between the frame and a support bar.

FIG. 26 is a top elevation showing an alternative means of attaching the support-frame to the vehicle.

FIG. 27 is an end elevation showing the alternative means of attaching the support-frame to the vehicle.

FIG. 28 is a side elevation showing the alternative means of attaching the support-frame to the vehicle.

DETAILED DESCRIPTION OF THE INVENTION

Figure 1:
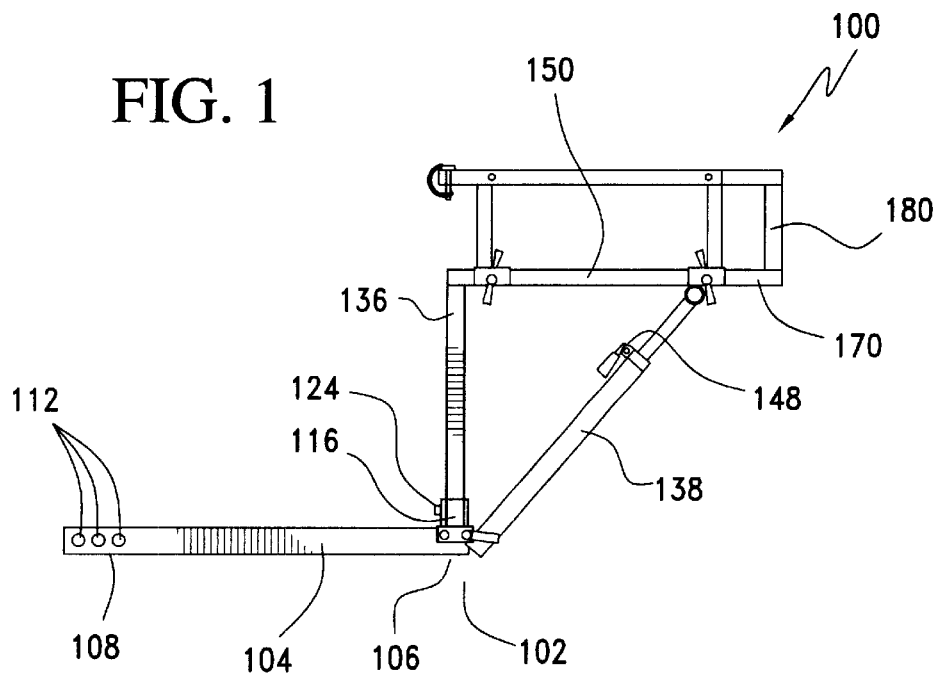
FIG. 1 is a side elevation of a cargo carrier in accordance with a presently preferred embodiment of the invention.
Figure 2:
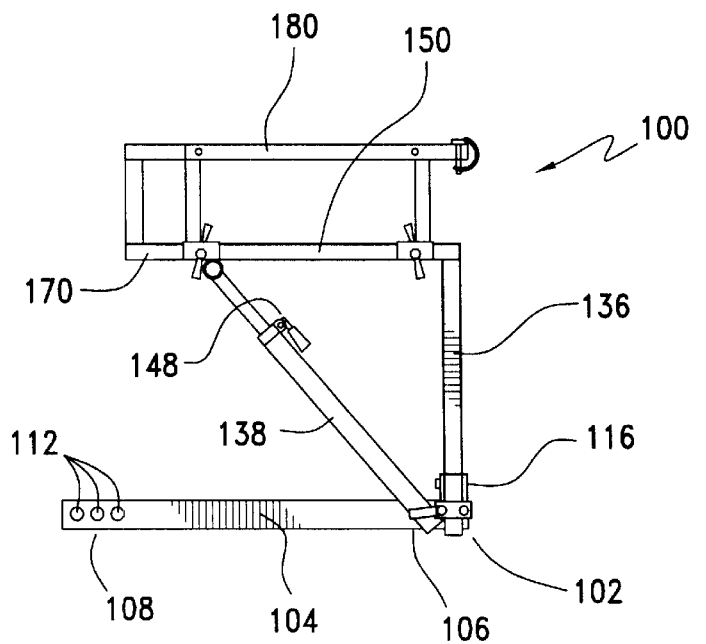
FIG. 2 is a side elevation of the cargo carrier oriented differently from the manner depicted in FIG. 1.
Figure 3:
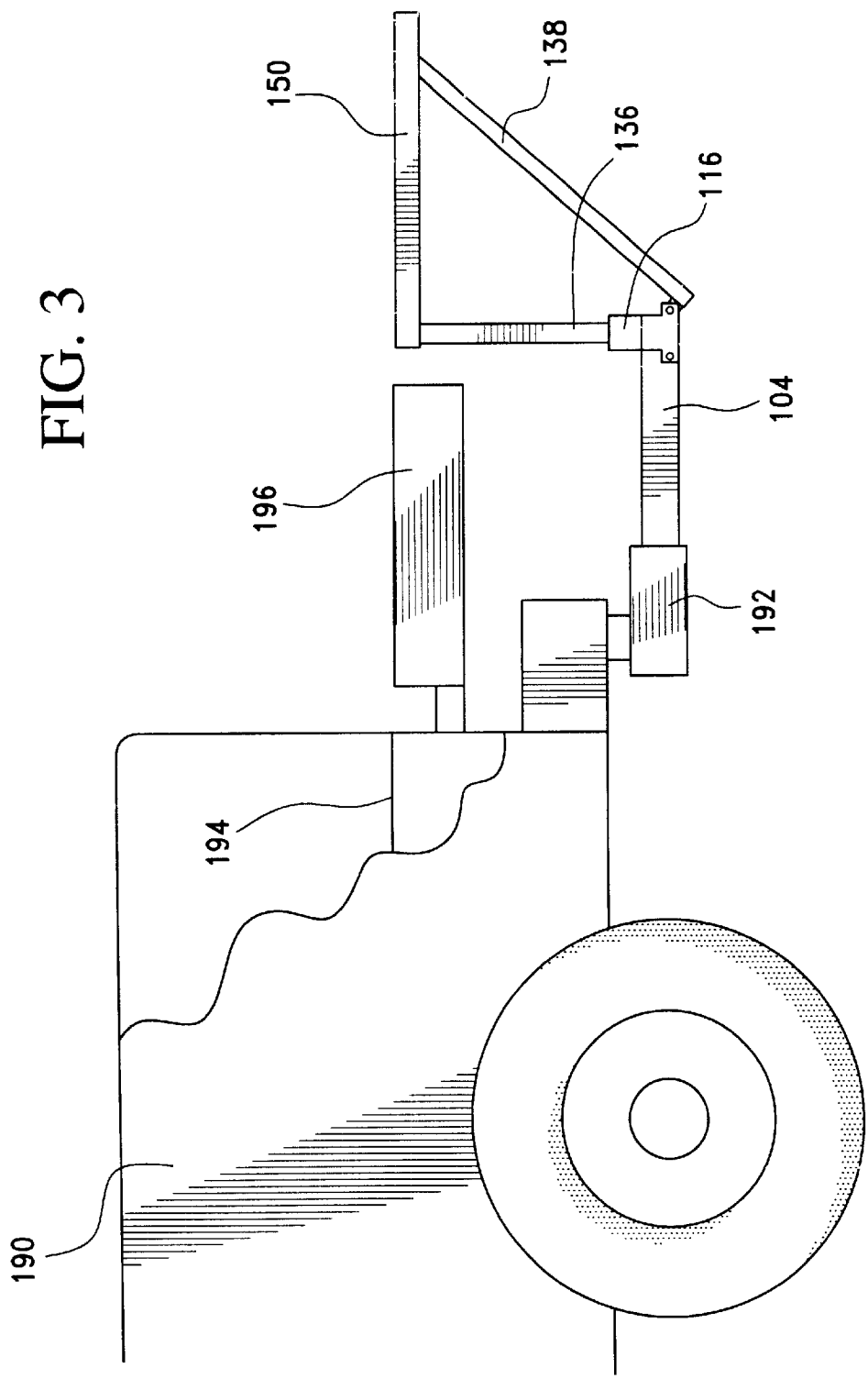
FIG. 3 is a schematic of the cargo carrier attached to a vehicle in the orientation of FIG. 1.
Figure 4:
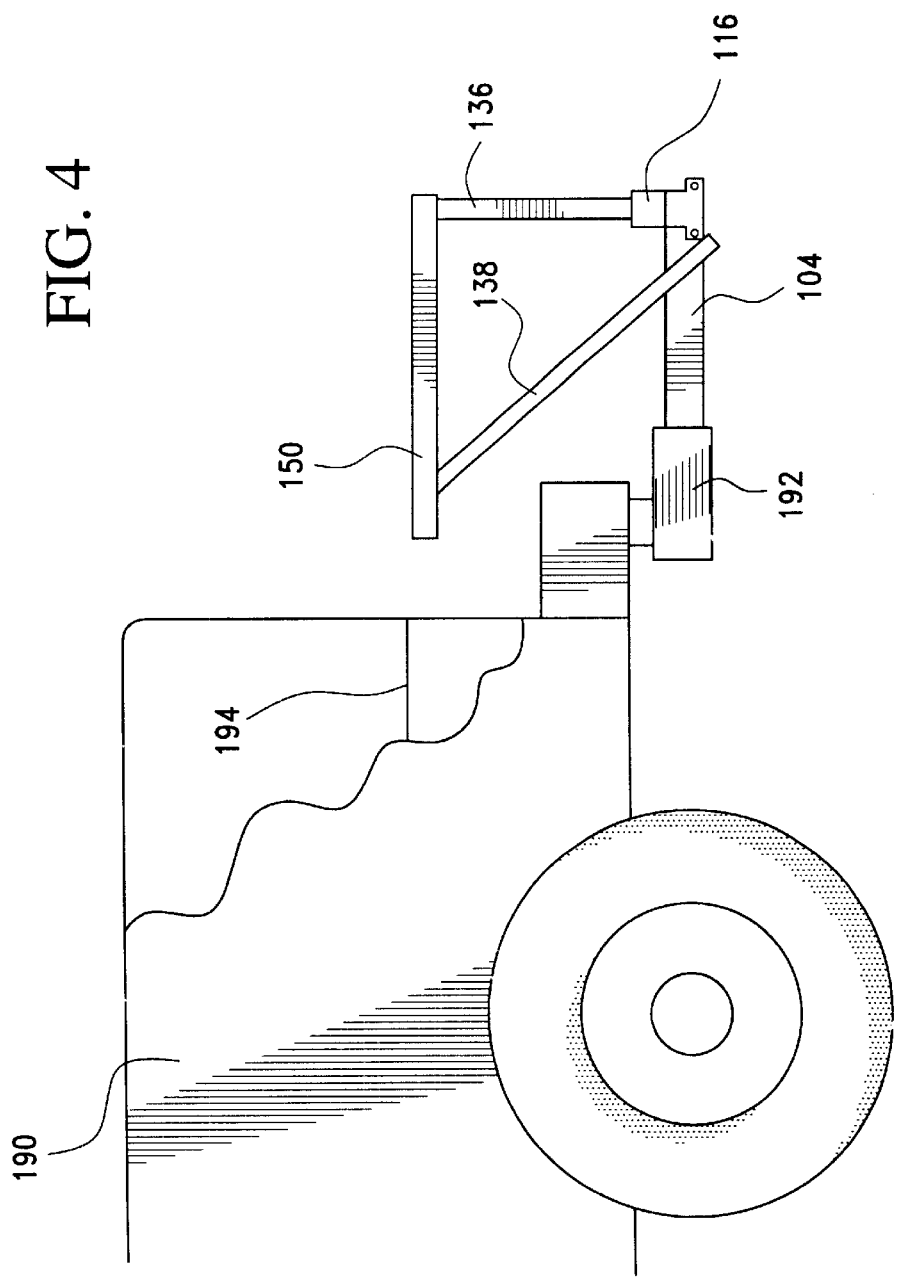
FIG. 4 is a schematic of the cargo carrier attached to a vehicle in the orientation of FIG. 2.

Referring now to the drawings, FIGS. 1 and 2 show two orientations of a supplementary cargo carrier 100 for a vehicle 190. FIGS. 3 and 4 schematically show the carrier 100 attached to the vehicle 190 in the orientations of FIGS. 1 and 2, respectively.

The carrier 100 includes a T-shaped support-frame 102 with a longitudinal element or stem 104 having a first end 106 and a second end 108, and a lateral element or crossbar 114 attached to the stem 104 at the first end 106. In the context of this disclosure, the terms "longitudinal" and "lateral" will always be understood to be in reference to the orientation of the vehicle 190 when the carrier 100 is attached thereto. The stem 104 and the crossbar 114 are typically cold roll steel tubing with a 2" (50 mm) square cross section and a wall thickness of 0.125" (3 mm), to be compatible with a nominal 2" trailer hitch such as a Reese hitch. However, the support-frame 102 could alternatively have a cross-section of 1.25" (32 mm) to conform with a correspondingly smaller Reese-type hitch. Other components of the carrier 100 to be described later could be scaled down accordingly. The second end 108 of the stem 104 is typically attached to the vehicle trailer hitch 192, although other attachment means are possible as will be mentioned later. Any selected pair of three pairs of opposed attachment holes 112 at the second end 108 can be used for coupling the stem 104 to the hitch 192.

Figure 5:
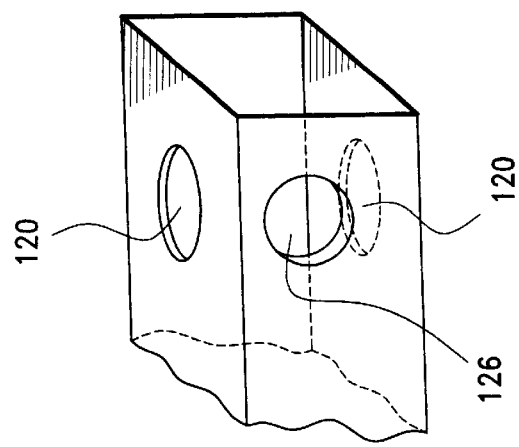
FIG. 5 is a perspective view of a support-frame.
Figure 5:
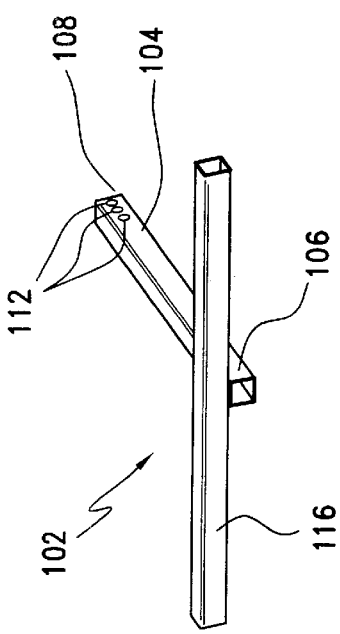

The first end 106 of the stem 104 and the crossbar 114 may be connected in a variety of ways. Preferably, they are welded together, so that the crossbar 114 is atop the stem 104 as shown in FIG. 5. It should be noted that the structure of FIG. 5 confers a degree of strength to the support-frame 102, since the stem 104 can resist a downward force exerted by a load on the crossbar 114. Among alternative means of securing the stem 104 and crossbar 114 together are available, such as bolting. In particular, a means of separably securing them together will be described later in this disclosure.

Figure 6:
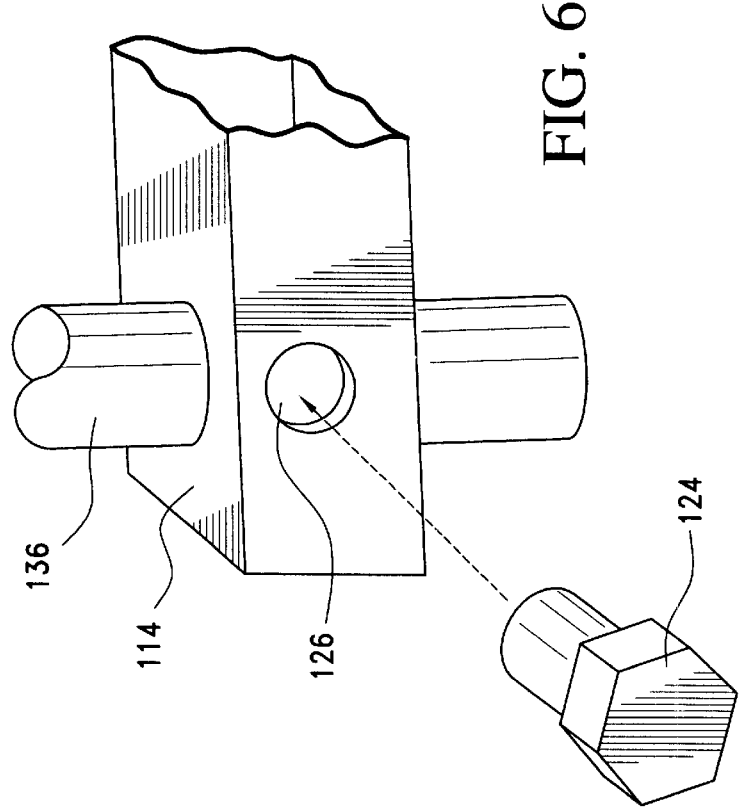
FIG. 6 is a perspective view showing detail of one means of attachment of an upright bar to the support-frame.
Figure 7:
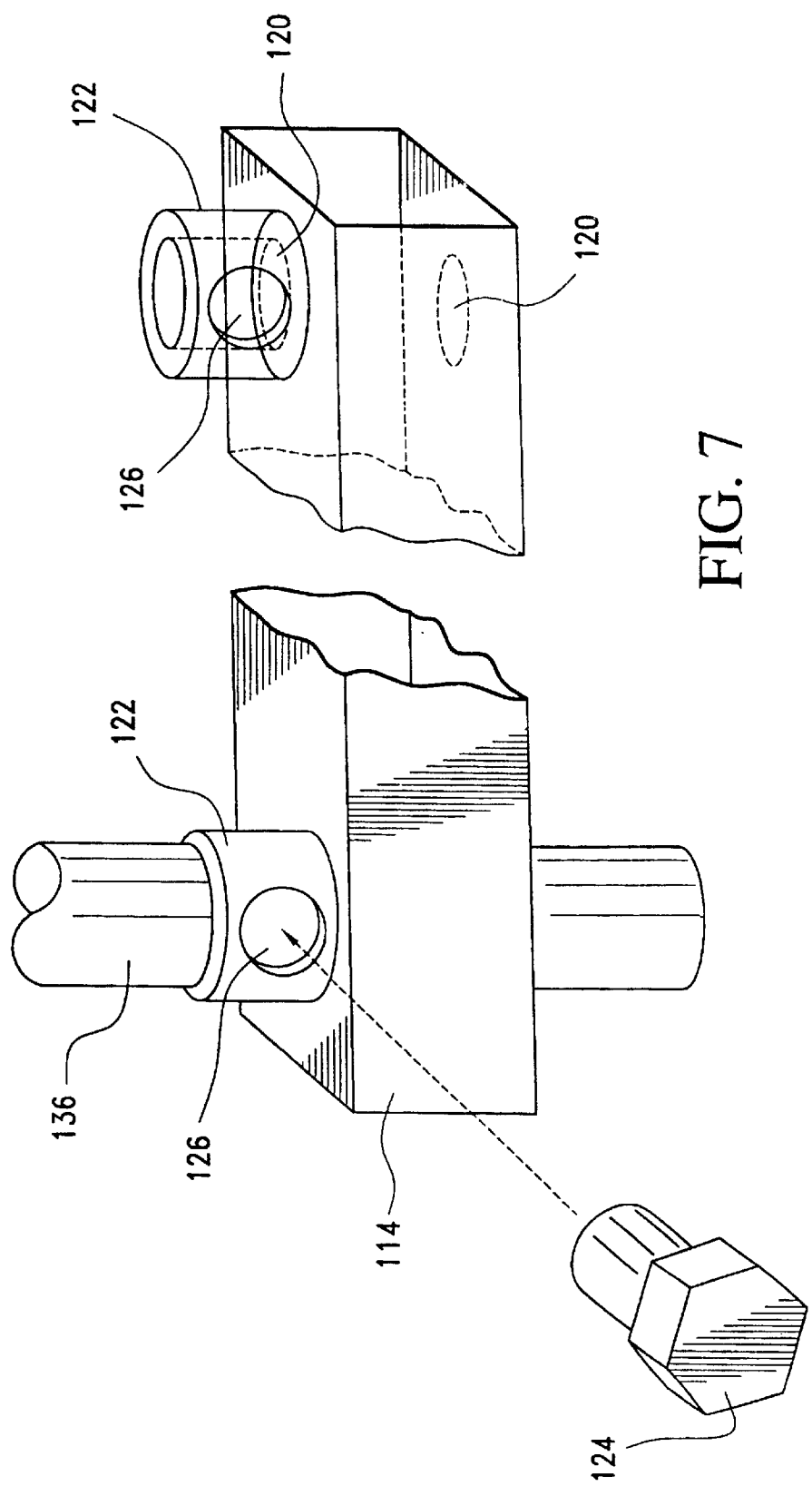
FIG. 7 is a perspective view showing detail of a further means of attachment of the upright bar to the support-frame.
Figures 10, 11:
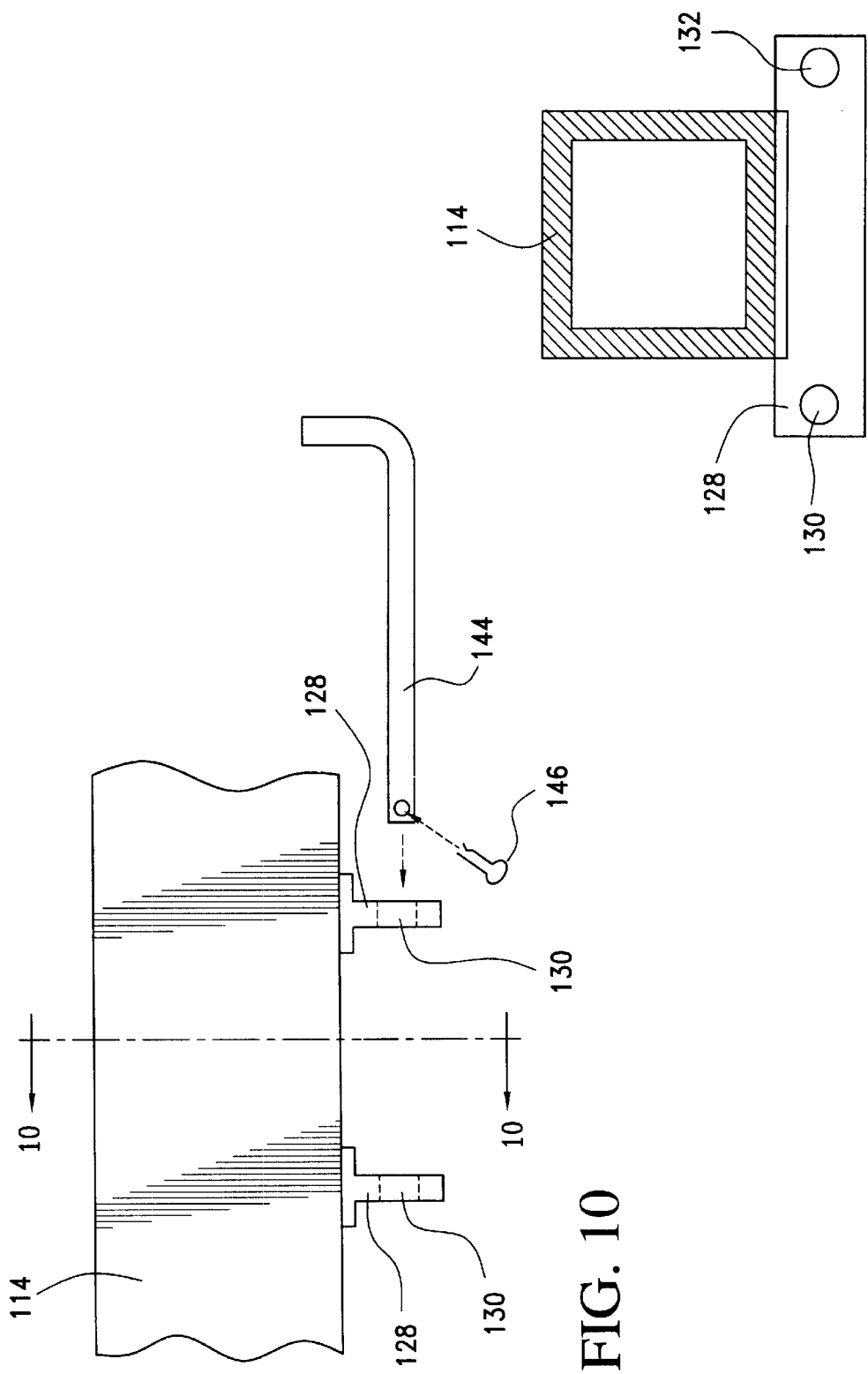
FIG. 10 is a schematic showing in front elevation a portion of the support-frame including struts for attaching an inclined bar thereto.
FIG. 11 is a cross section across 10—10 of FIG. 10.

Two first support bars 136 extend upwardly from the crossbar 114 to a platform 150 which includes a frame 160. Since the first support bars 136 are always vertical or nearly so, they will be referred to as upright bars. The upright bars 136 typically have a cylindrical cross-section and engage the crossbar 114 at pairs of opposed mounting holes 120, as shown in the schematic detail of FIG. 6. A given upright bar 136 can be adjustably secured to the crossbar 114 by tightening a set screw 124 which threadedly engages a hole 126. In other words, the upright bars 136 are vertically translatable relative to the crossbar 114, and can be selectably secured at any set height by tightening the set screws 124. In an alternative means of securing the upright bars 136 to the crossbar 114, the hole 126 is located in a collar 122 which is welded atop the crossbar 114, as shown in FIG. 7. In a further possible means of attachment (not shown), the collar 122 could be a split collar welded atop the crossbar in such a manner as to allow a cam lock to be used As shown particularly in FIG. 8(a), the frame 160 has a lateral first side 162 and second side 164, longitudinal ends 166 and a lateral cross-member 168 which is typically spaced apart from the second side 164; however, the frame 160 may optionally be configured so that the cross-member 168 and the second side 164 are one and the same. The first side 162 and the cross-member 168 may also be designated as first and second frame members, which are always distinct from one another. The first side 162 and the cross-member 168 are formed from cylindrical aluminum tubing with an outside diameter of 1" (25 mm) and a wall thickness of 0.063" (1.6 mm). Typically, the second side 164 and the ends 166 are formed as a single main member from a piece aluminum tubing with a 1" (25 mm) square outside cross-section and a wall thickness of 0.063" (1.6 mm). The cross-member 168 is parallel to the sides 162 and 164, but nearer to the second side 164. The various components of the frame 160 are typically welded together. The sides 162 and 164, and the ends 166 of frame usually coincide with edges 152 of the platform 150. In the most preferred configuration of the frame 160, the sides 162 and 164 and ends 166 are in a single plane, while the cross-member 168 lies beneath the aforementioned plane with reference to the intended load-bearing orientation of the platform 150, as indicated in FIG. 8(b). However, other configurations are possible, including the cross-member 168 being in the same plane as the sides 162 and 164 and the ends 166.

Each upright bar 136 is pivotally attached to the first side 162 of the frame 160. One means of attachment is by a T-joint such as 170, which may simply be provided by welding a short portion of the upright bar material to the upper end of the upright bar as indicated in FIG. 9. Other means of pivotal attachment (not shown) can include a split collar or a roller bearing, for example. The upright bars 136 are typically vertically adjusted so that the platform 150 is at the same level as a truck bed 194, and the pivotal connections allow a user to tilt the platform 150 in an arc about the first side 162.

Two tubular telescopic second support bars 138 extend from the crossbar 114 to the cross-member 168, being pivotally attached to each. Since the second support bars 138 are intended to be disposed in a wide range of inclinations, they will be referred to as inclined bars. Their inclination may of course include horizontal and vertical orientations. The inclined bars 138 are joined to the cross-member 168 similarly to the attachment of the upright bars 136 to the first side 162, for example using the T-joint of FIG. 9. The inclined bars 138 can pivot about the cross-member 168 in a longitudinal, vertical plane.

The upright bars 136 and inclined bars 138 are preferably fabricated from a Schedule 40 stainless steel tubing, although other materials may be used. The upright bars 136 and a thicker portion of the inclined bars 138 have an outside diameter of 1.31" (33 mm) and a wall thickness of 0.125" (3 mm). A thinner portion of the inclined bars 138 which slidingly engages the thicker portion has an outside diameter of approximately 1" (25 mm) and a wall thickness of 0.125" (3 mm).

The inclined bars 138 are attached to the crossbar 114 as illustrated in FIGS. 10, 11, 12 and 13. Beneath the crossbar 114 is welded a pair of vertical struts 128, which together have a front pair 130 and a rear pair 132 of opposed holes. The struts 128 could alternatively be fastened to the crossbar 114 by other means such as bolts. The holes 130 and 132 are in portions of the struts 128 extending beyond the crossbar 114. The end of the inclined bar 138 nearest to the crossbar 114 has an attachment member 140 which fits between the struts 128. When a transverse hole 142 in the attachment member 140 is aligned with either pair of holes 130 or 132, the inclined bar 138 can be secured to the struts 128 by a fastener such as a pin 144 held in place by a hitch pin 146. The inclined bars 138 can be fixed at a selected length by cam locks 148.

The perpendicular distance between the inclined bars 138 is greater than that between the upright bars 136, the bars being symmetrically connected to the crossbar 114 relative to the position of the stem 104.

To summarize the relationship between the frame 160 and the crossbar 114, then, the upright bars 136 and the inclined bars 138 each provide slidable support members which allow the frame 160 to be secured in a selectable orientation relative to the crossbar 114. The first side 162 is connected to the crossbar 114 by the upright bars 136, while the cross-member 168 is connected to the struts 128 by the inclined bars 138. The upright bars 136 can be secured with the set screws 124 to extend upwardly from the crossbar 114 by a first selected distance, and the inclined bars 138 can extend from the crossbar 114 by a second selected distance, whereat they are secured by the cam locks 148. Since each upright bar 136 has a pivotal attachment to the frame 160, and each inclined bar 138 is pivotally attached to both the cross-member 168 and the crossbar 114, it is readily appreciated that the set height of the upright bars 136 determines the elevation of the first side 162 of the frame 160. The distance to which the inclined bars 138 are extended relative to the set height of the upright bars 136 determines the slope of the frame 160 and therefore of the platform 150.

It is emphasized that while the carrier 100 has been disclosed as having a pair of upright bars 136 and a pair of inclined bars 138, it might be structured so that the number of inclined bars 138 could be either less than or greater than two. Similarly, the number of upright bars 136 could be less than or greater than two. For example, the carrier 100 might have a pair of upright bars 136 and a single inclined bar 138. In this case, the inclined bar 138 might be more massive than if two such bars were used, in order to support a similar load. Alternatively, it might be no more massive than if two such bars were used, it not being intended to support as heavy a load. The number of upright and inclined bars would be determined by several considerations such as ease and cost of manufacture, portability of individual components, convenience in setting up, and load-bearing requirements.

It is understood that while the upright bars 136 are secured in position by the set screws 124, they could alternatively be secured by other means, such as by providing a plurality of holes and a pin, by which they would be secured in discrete positions. Furthermore, the upright bars 136 could be telescopic and held to a selected length by cam locks. Similarly, the inclined bars 138 could be configured in a variety of ways besides those disclosed herein.

The combination of translatable upright bars 136 and inclined bars 138 describe above allows the user to vary the inclination of the platform 150 within an arc so that the assembly can provide a horizontal bed extender, an inclined plane or a vertical supplemental tailgate.

Figure 14:
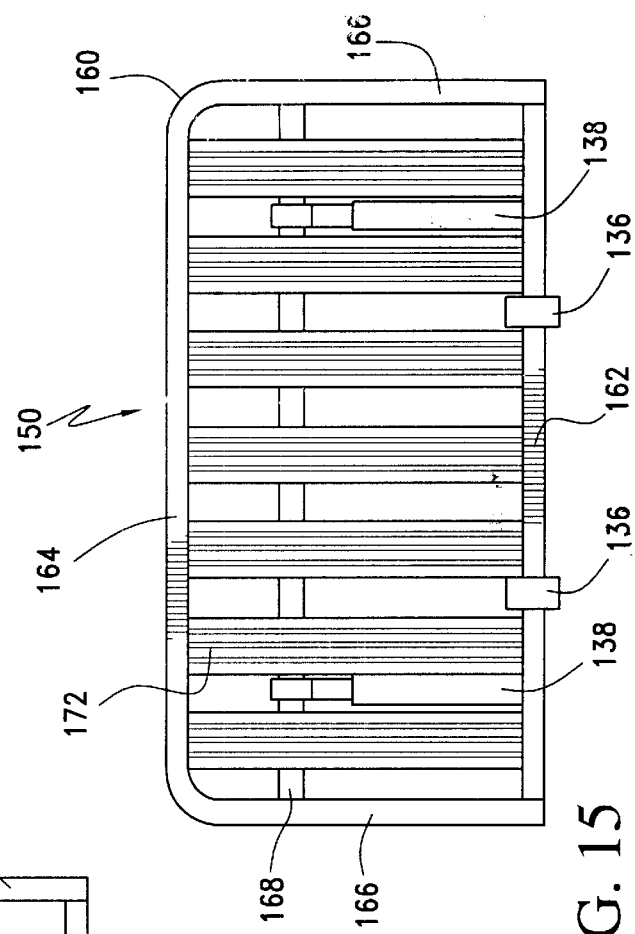
FIG. 14 is a plan view of a platform.
Figure 15:
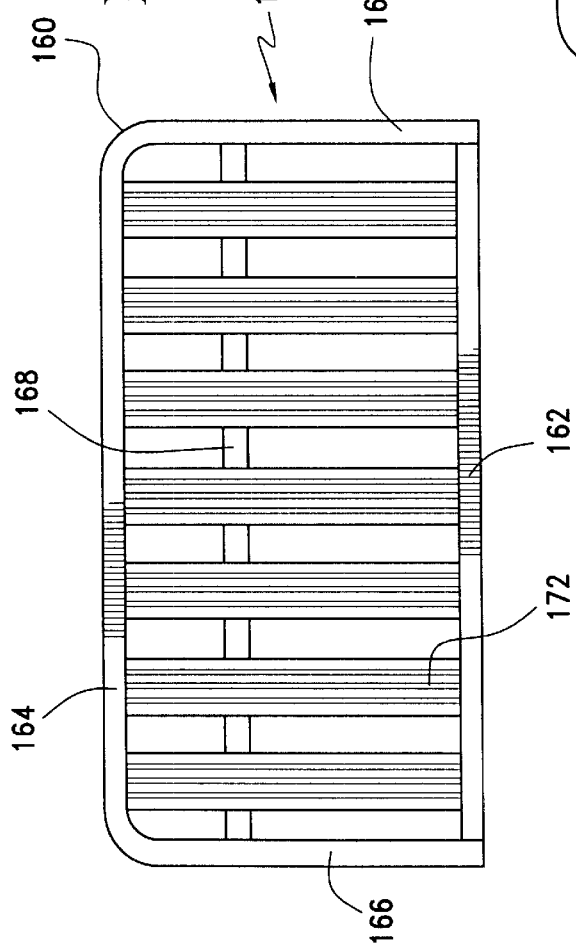
FIG. 15 is a plan view of the platform with support bars attached thereto.

FIG. 14 shows the platform 150 which is formed from a plurality of spaced apart slats 172 extending longitudinally from the first side 162 to the second side 164 of the frame 160. These are typically made from extruded decking of 6063 aluminum alloy with a T6 temper. The platform 150 is configured so that the upright bars 136 and the inclined bars 138 can pivot about the first side 162 and the cross-member 168 at selected locations. The slats 172 are sized and positioned to provide clearance for the upright bars 136 and inclined bars 138 to pivot. In the assembled platform 150 the main member, the first side 162, the cross-member 168 and the slats 172 are joined together, preferably with welded joints. The upright bars 136 and the inclined bar are located in positions between certain of the slats 172 as shown in FIG. 15. The slats 172 are affixed to the frame 160 frame by welding, but may alternatively be affixed thereto by rivets, bolts or other means. Normally, the slats 172 are in the same plane as the sides 162 and 164 and ends 166 of the frame 160. Alternatively, the slats 172 may be disposed atop the frame 160 with reference to the intended load-bearing configuration of the platform 150. Some embodiments of the invention allow that the platform 150 is sometimes inverted, and it may be desired to provide for this by including two equally functional opposed surfaces. This may for example be achieved by structuring the platform 150 so that the slats 172 and all portions of the frame 160 including the sides 162 and 164, the ends 166 and the crossbar 168 lie in the same plane.

Certain configurations of the carrier 100 will be described, in all of which it is assumed that the support-frame 102 is attached to the trailer hitch 192 in manner which is well known in the art, the stem 104 being directed rearward from the vehicle. Until stated otherwise, it will first be assumed that the inclined bars 138 are affixed to the struts 128 via the rear holes 132 thereof. Consequently, the inclined bars 138 extend from the crossbar 114 in a direction generally opposed to the direction of the stem 104, as in FIGS. 1 and 3.

In a first configuration, the bed 194 of the vehicle 190 may for example have a drop-down tailgate 196. The upright bars 136 are secured to the crossbar 114 at such a height that the platform 150 is generally at the same level as a truck bed 194 of the vehicle 190 and of the tailgate 196 in an open, i.e., horizontal position. The lengths of the inclined bars 138 are adjusted so that the platform 150 has no significant inclination relative to the horizontal. The carrier is structured so that the truck bed 194 and the platform 150 are spaced far enough apart so that the tailgate 196 when open can just fit between them. Thus, the tailgate 196 and the platform 150 together provide an effective extension for the truck bed 194. This configuration for example provides for supporting cargo which extends too far to be properly supported within the normal limits of the vehicle.

Figure 16:
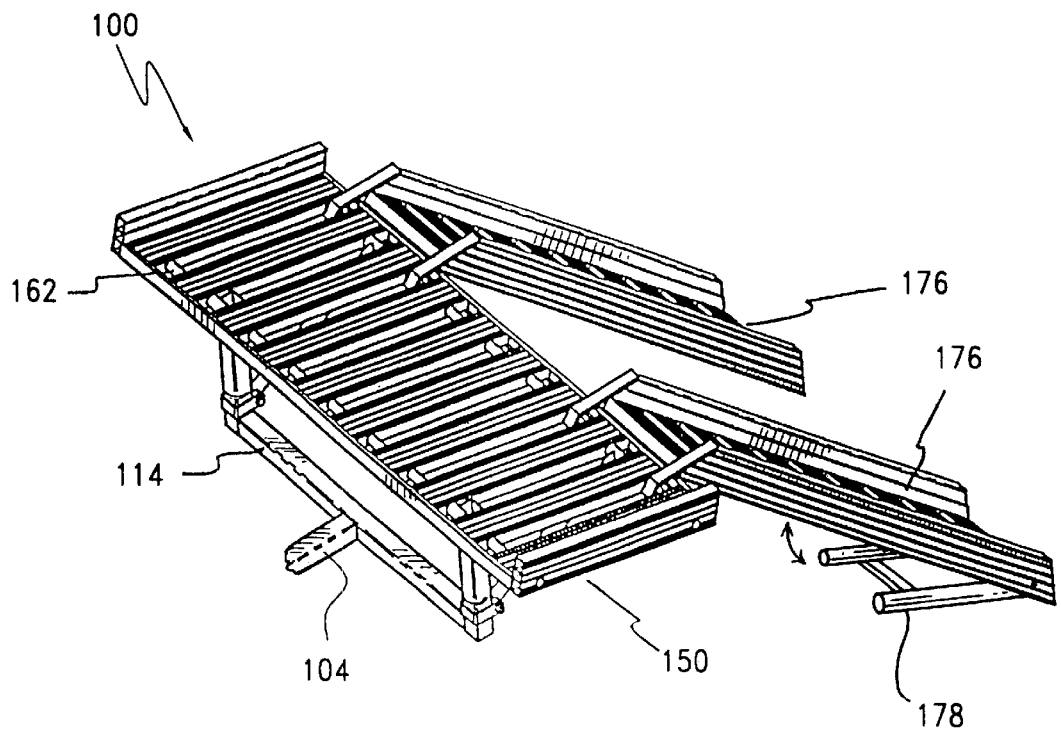
FIG. 16 is a perspective view of the cargo carrier including ramps.

In a second configuration, the platform 150 is inclined so that it slopes downwardly towards the rear. In the second configuration, the platform 150 provides a surface which facilitates the loading or unloading of cargo. In this configuration, the inclined bars 138 are shortened relative to the first configuration. The cargo may be a wheeled machine such as an all-terrain vehicle, a small tractor, a lawn mower or the like, or may be a normally immobile item such as furniture which is to be moved with a wheeled moving device such as a dolly or a handcart. While it is understood that the platform 150 could be constructed so that in the second configuration it would extend all the way from the level of the truck bed 194 to ground level, it is contemplated that typically the platform 150 would not be sized appropriately to permit this. Either it would not extend far enough to contact the ground or, if it did so, it would be too steeply inclined. Therefore, as shown in FIG. 16, one or more platform extenders or ramps 176 are provided which are removably attachable to the rear of the platform 150, and extend between the platform 150 and ground level.

Figure 17:
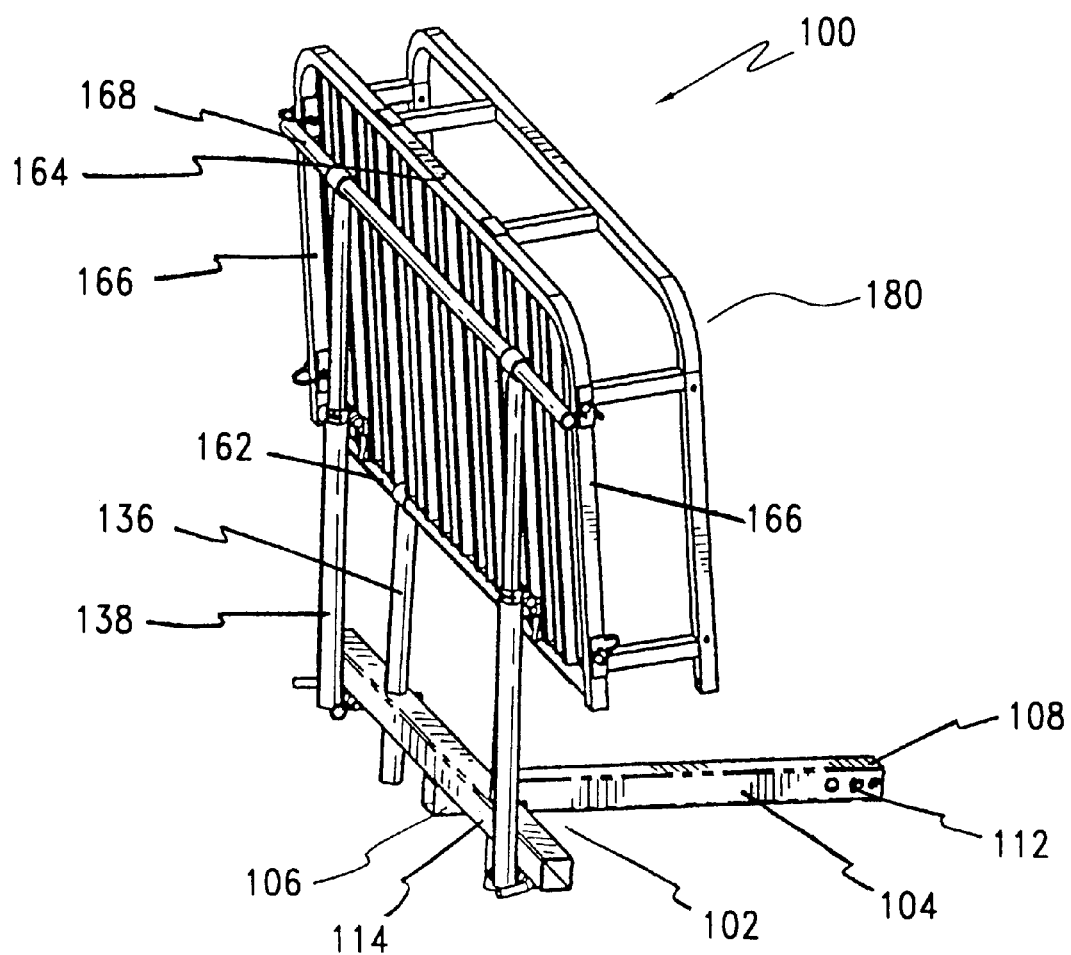
FIG. 17 is a perspective view of the cargo carrier in a stowed configuration.

In a third configuration of the frame 160, the platform 150 is vertically disposed, as shown in FIG. 17. In this configuration, the inclined bars 138 are extended to their maximum required length. This configuration is contemplated when for example the carrier is stowed to reduce the space it occupies, as might be required for parking the vehicle for example.

For further configurations, it will now be assumed that the inclined bars 138 are affixed to the front holes 130 of the struts 128. Consequently, the inclined bars 138 extend from the crossbar 114 in a generally similar direction to the stem 104.

In a fourth configuration, the relative adjustments of the upright bars 136 and the inclined bars 138 provide that the platform 150 is substantially horizontal, and extends forward with respect to the crossbar 114. The platform 150 is much closer to the vehicle than in the first configuration, and the carrier 100 is therefore more compact. This configuration lends itself to use for example if a flatbed truck has no tailgate, or as an auxiliary cargo carrier for any type of vehicle such as a sedan with a suitable hitch 192.

In a fifth configuration, the platform 150 is vertically disposed. In this configuration, the inclined bars 138 are extended to their maximum required length. This configuration is visualized when for example the carrier 100 is stowed to reduce the space it occupies, as might be required for parking the vehicle. It could also provide a gate for a flatbed truck if it otherwise lacks a tailgate. This is the most compact among the aforementioned configurations.

Other configurations are possible; for example, in a variation from the first configuration, the vehicle may be backed against a raised loading dock, with the platform 150 possibly somewhat inclined upward or downward to provide for loading or unloading cargo between the vehicle and the dock. In this case the rearmost part of the platform 150 could rest on the dock.

Figure 18:
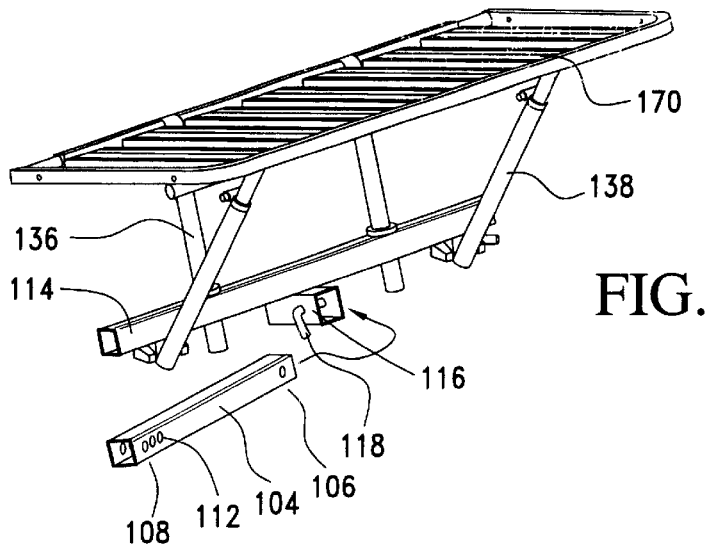
FIG. 18 is a perspective view of the cargo carrier including a removable member of the support-frame.
Figure 19:
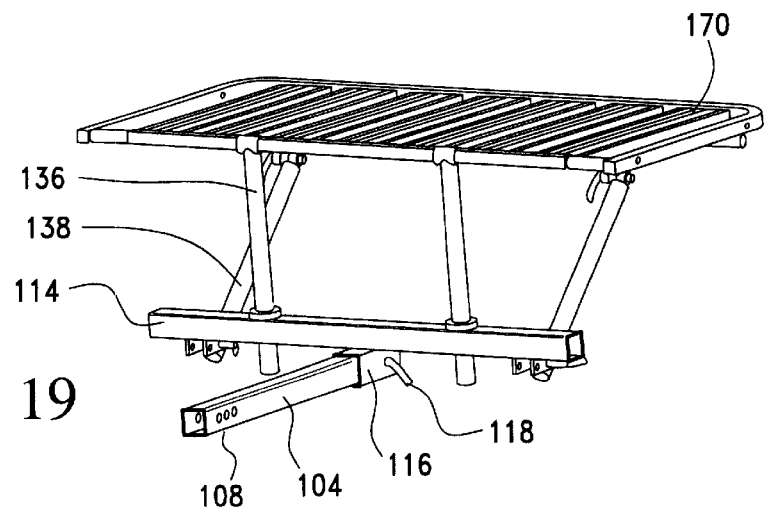
FIG. 19 is a perspective view of the cargo carrier wherein the removable member has a selected orientation.
Figure 20:
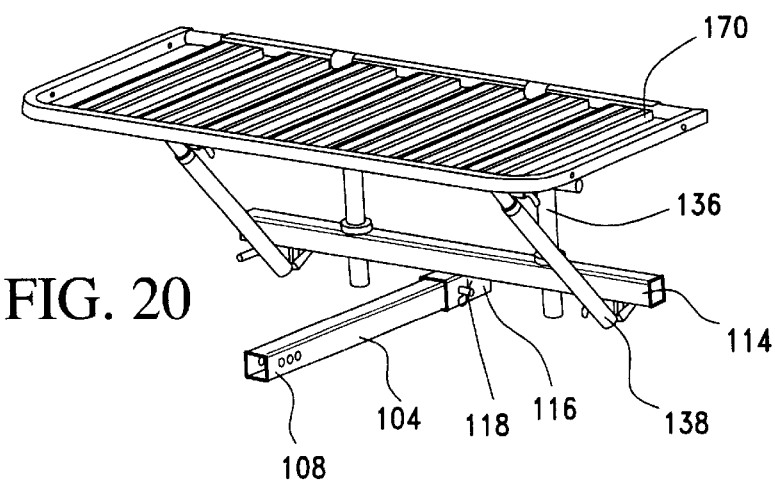
FIG. 20 is a perspective view of the cargo carrier wherein the removable member has a selected orientation opposed to that of FIG. 18.

In a most preferred first embodiment, the support-frame 102 is structured so that the stem 104 can be removably joined to the crossbar as shown in FIGS. 18, 19 and 20. The crossbar 114 has welded to its underside a longitudinally aligned receiving member 116 which is configured to receive the first end 106 of the stem 104 from either direction. Once the stem 104 and receiving member 116 engage, they can be secured together with a support fastener 118 which may for example be a pin and hitch pin. This permits an intact assembly including the platform and crossbar to be selectably oriented so that the platform would extend relative to the stem 104 in either the same general direction as the stem 104 as in FIG. 19, or in a generally opposed direction as in FIG. 20. In this embodiment, the struts 128 need only have one pair of opposed holes, since alternative pairs of holes 130 and 132 are only needed for providing opposite orientations of the platform relative to the crossbar. In this embodiment, the platform 150 never needs to be reversed relative to the crossbar 114.

In a second embodiment, the platform 150 may be structured to be reversible by configuring the inclined bars 138 so that they are short enough to permit their rotation about the cross-member 168 without interference from the first side 162. Thus, the inclined bars 138 may be freely pivoted through the plane of the platform 150.

In a third embodiment, which has neither of the features of the first and second embodiments which facilitate reversal, the platform nevertheless has the capability of being reversed depending on how the individual upright bars 136 and inclined bars 138 are positioned relative to the stem 104.

Other applications for the carrier 100 suggest themselves beyond the carrying of cargo. For example, the platform 150 may be horizontally disposed as a table for refreshments, as might typically be suitable for a "tailgate party". More table area could be provided using the ramps 176, which at their front end would be secured to the platform 150 as usual, and at their back end would be supported by folding or collapsible legs 178.

Optionally, a suitably configured guard 180 can be fitted to the frame 160, in order to assist in properly confining cargo. The guard 180 is typically removable, and may take a variety of forms, such as a railing or a more solid wall. It could for example include slats similar to those of the main platform 150. The guard may include separately removable units which can be affixed to the frame or stacked one on top of another as required, using for example readily removable fasteners such as pins or bolts.

In several embodiments, the platform is 2' (610 mm) long and either 4'4" (1.445 m) or 5' (1.525 m) wide. Different dimensions can be used in different applications. The slats are approximately 4" (100 mm) wide by 22.5" (572 mm) long.

Figure 22:
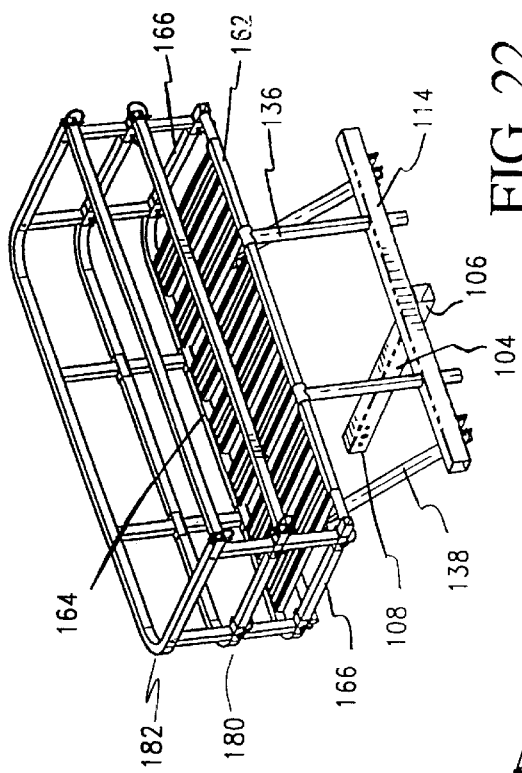
FIGS. 21, 22 and 23 are perspective views of the cargo carrier including a guard in various arrangements.
Figure 21:
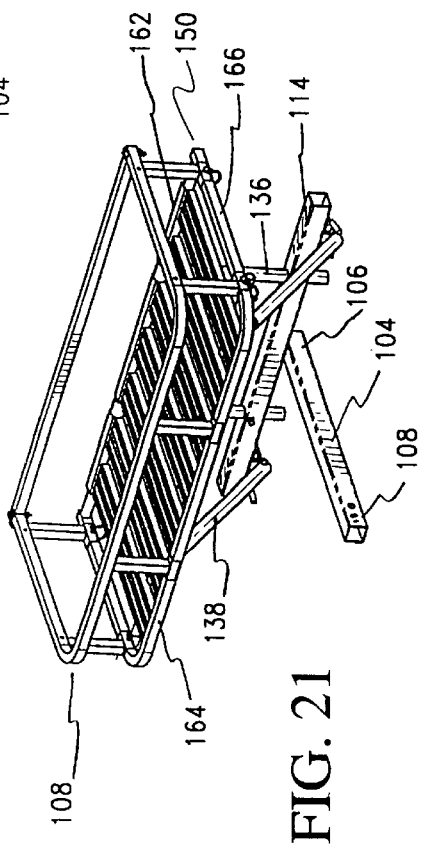
Figure 23:
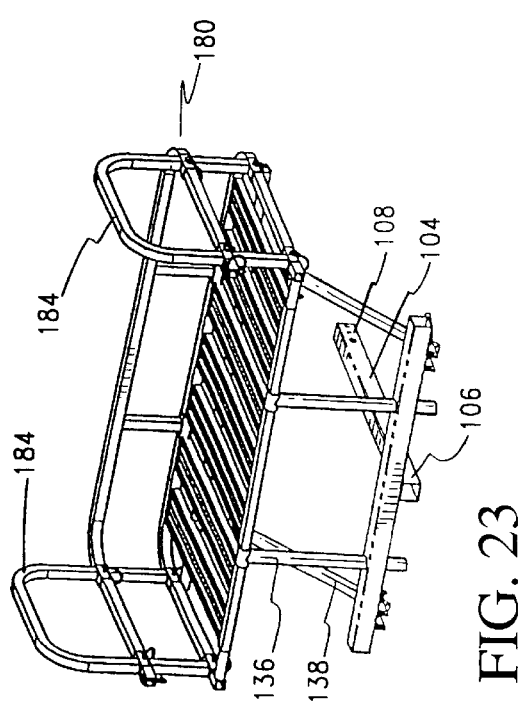

Examples of different configurations of the guard 180 are shown in FIGS. 21, 22 and 23, in which it is depicted in its preferred form of a railing. In FIG. 21, the guard 180 consists of a single unit corresponding to the entire perimeter of the platform 150. In FIG. 22, the guard 180 also extends completely around the platform 150 as in FIG. 21, but includes a second unit 182 stacked atop the original unit. In FIG. 23, the guard 180 has one unit conforming to the second side 164 and both ends 166 of the frame 160, and has an additional unit 184 providing additional height at each end 166. In this drawing, the guard 180 is configured to leave the platform 150 open at the first side 162. In fact, the guard 180 can be configured to conform with any or all edges 152 of the platform, and can be extended upward by adding units to any practical height. If it is desired to subdivide the area of the platform 150, the guard 180 can be configured to include a subdividing portion (not shown).

In order to appreciate the method of use of the cargo carrier 100, it will be remembered that the major parts of the carrier 100 when dismantled are the support-frame 102, the platform 150, the ramps 176 and the guard 180. It will also be remembered that the upright bars 136 and the inclined bars 138 are normally permanently, pivotally attached to the frame 160 of the platform 150. The parts are readily portable and can be carried in the vehicle until required.

Figure 12:
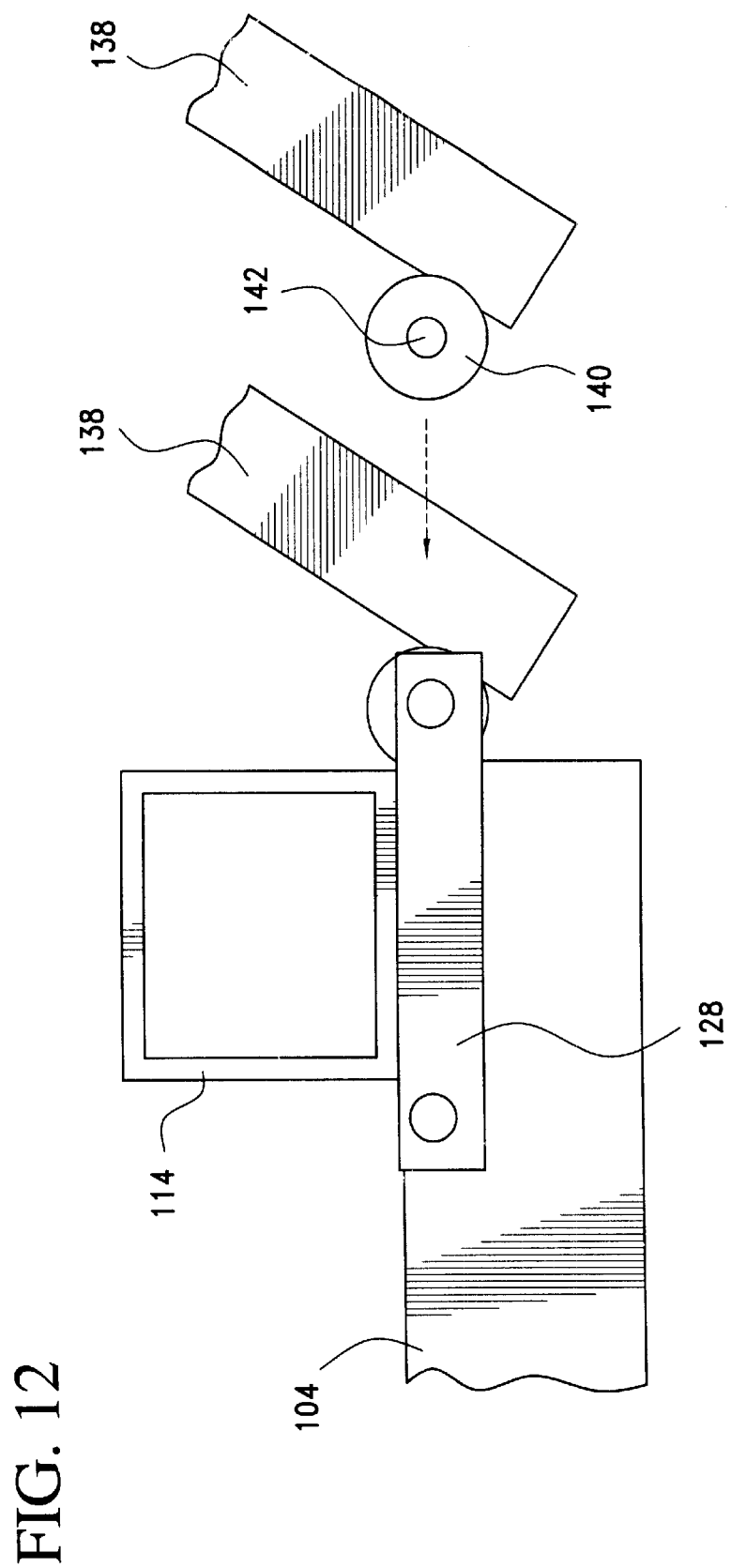
FIG. 12 is a schematic showing the attachment of the inclined bar to the support-frame in one orientation.
Figure 13:
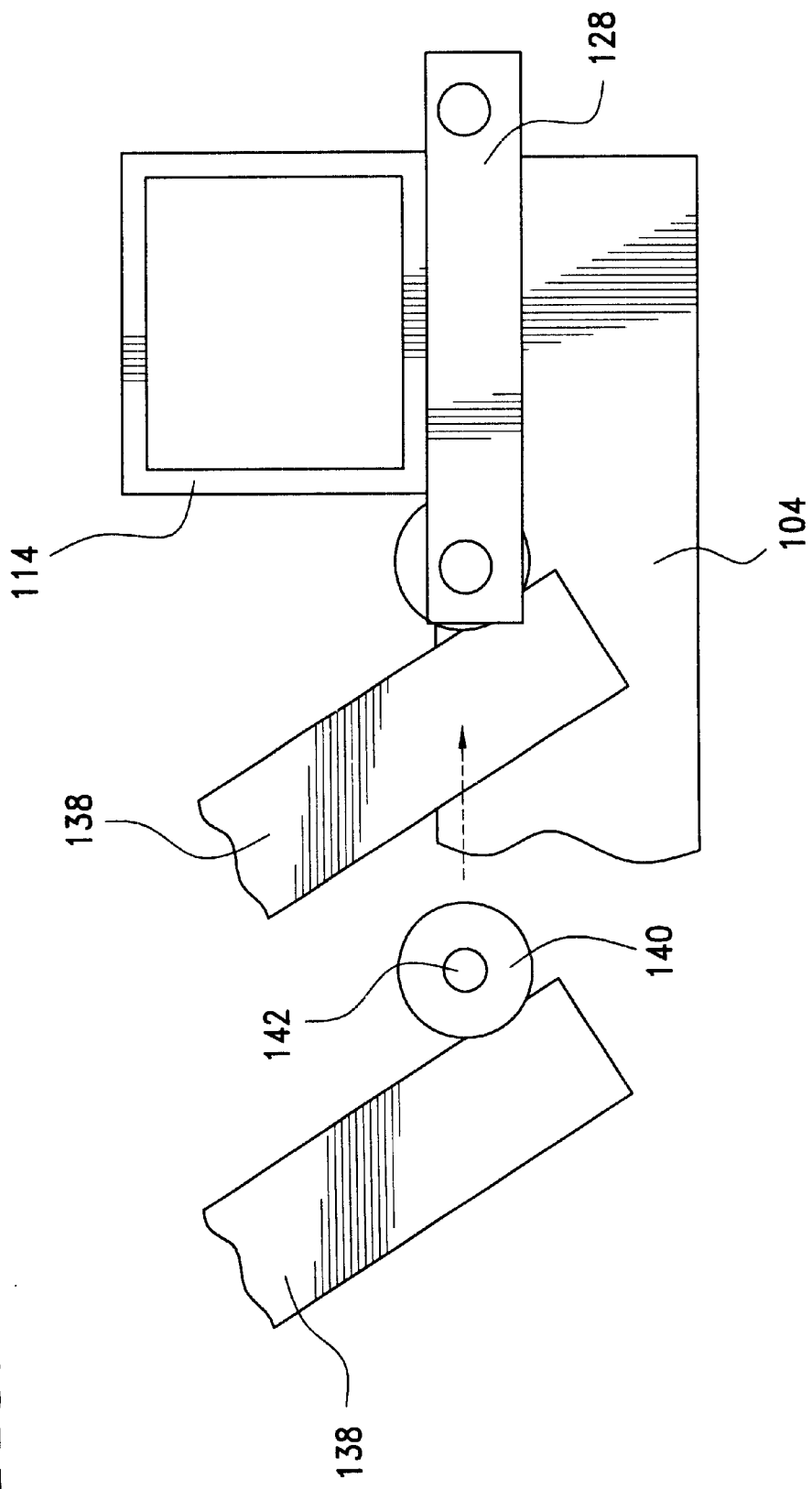
FIG. 13 is a schematic showing the attachment of the inclined bar to the support-frame in an orientation opposed to that of FIG. 12.

For an example of using the structure, it is selected that the platform 150 should project relative to the crossbar 114 in a general direction opposed to the stem 104. The upright bars 136 are inserted through the mounting holes 120 in the crossbar 114, and secured at a selected height by tightening the set screws 124. The attachment member 140 of one of the inclined bars 138 is aligned with the rear holes 132 of the appropriate crossbar struts 128 as shown in FIG. 12. The pin 144 is passed through the rear holes 132 of the struts 128 and the transverse hole 142 of the attachment member 140, and secured by the hitch pin 146. This step is repeated with the other inclined bar 138. The choice of the rear holes 132 for affixing the inclined bars 138 to the struts 128 determines that the inclined bars 138 extend rearward therefrom, to allow the platform 150 to project rearward. The inclined bars 138 are secured at the length appropriate for the desired inclination of the platform 150 by tightening the cam locks 148.

The first embodiment permits the user to reverse the configuration so that the platform 150 can extend forward rather than rearward. The support fastener 118 is removed and the crossbar 114 is separated from the stem 104. The orientation of the crossbar 114 is reversed, and it is then reengaged with the stem 104. The fastener 118 is reinstalled to secure the stem 104 and crossbar 114 together again. Only one fastening means, the support fastener 118, needs to be handled to allow this reversal, which is therefore very simple to carry out. In this embodiment, the platform 150 needs only have one functional load bearing surface.

The second embodiment also permits the user to reverse the configuration so that the platform 150 can extend in the same general direction as the stem 104. The inclined bars 138 are disengaged from the struts 128 by removing the hitch pins 146 and the pins 144, and their length is collapsed to its shortest extent. The platform 150 is then pivoted so that it is disposed horizontally forward of the upright bars 136 instead of rearward. Because the inclined bars 138 are collapsed, they are free to pass between their adjacent slats 172, and can be downwardly oriented relative to the platform 150 in its new position. They are then extended so as to engage with the front holes 130 of the struts 128, whereto they are secured with the pins 144 and hitch pins 146. This arrangement is shown schematically in FIG. 13. In this embodiment, two fasteners need to be manipulated, and the platform 150 preferably has opposed functional load-bearing surfaces, either of which may be uppermost depending on whether the platform 150 and the stem 104 extend in similar or opposed directions.

The third embodiment differs from the second embodiment mainly in that the inclined bars 138 are not short enough to pass through the plane of the platform 150 without interference from the cross-member 168. However, even this embodiment permits the user to reverse the platform 150 so that it can extend in a direction similar to rather than opposed to the direction of the stem 104. The upright bars 136 and the inclined bars 138 are uncoupled from the crossbar by removing their respective fasteners. The orientation of the platform 150 is reversed until the upright bars 136 and the inclined bars 138 are proximate with the opposite fastening points, whereat they are resecured to the crossbar 114. In particular, the inclined bars 138 now engaged the struts 128 at front holes 130 rather than the rear holes 132. This embodiment is less convenient to reverse than the first and second embodiments, but is equally useful if the user only seldom needs to reverse the configuration once the cargo carrier 100 has been installed. However, since the same surface of the platform 150 would always be uppermost, the carrier 100 would be simpler and less expensive to assemble.

Any of the above methods can be used regardless of the whether the desired inclination of the platform 150 is horizontal, vertical, or any other inclination for which the carrier 100 is designed. Depending on the configuration selected, guards and/or ramps can be included, but a description of their use is not necessary for this disclosure.

Figure 24:
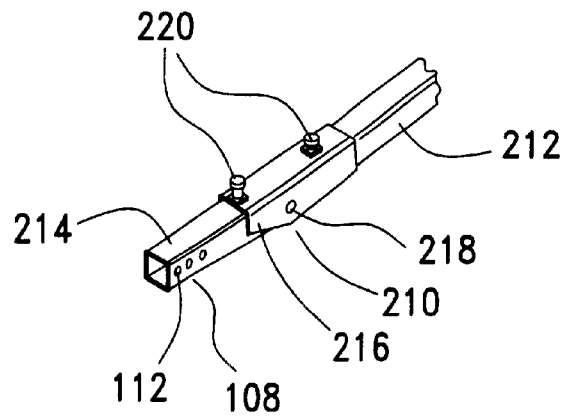
FIG. 24 is a perspective view of a composite longitudinal member of the support-frame.
Figure 25:
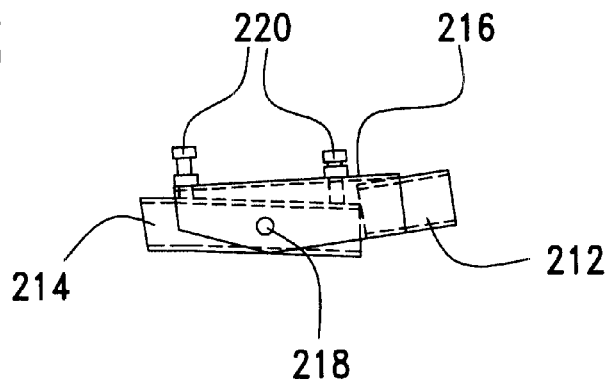
FIG. 25 is a side elevation of the composite longitudinal member.

In another variation, the crossbar may be have a pair of top mounted struts equivalent to the bottom mounted struts 128, but having only a single pair of holes as opposed to the front holes 130 and rear holes 132. This would eliminate the need for disengaging and reengaging the inclined bar from the struts when reversing the second embodiment of the carrier 100. However, it would geometrically preclude the platform 150 from having a true vertical configuration. When stowed, therefore, the carrier 100 would not be as compact and would be aesthetically less pleasing In yet another variation depicted in FIGS. 24 and 25, it is contemplated that the stem 104 is a composite longitudinal member 210 having a rear portion 212 encompassing the first end 106 which is attached to the crossbar 114, a front portion 214 encompassing the second end 108, and a coupling 216 which is fixedly attached to the rear portion 212 and attached to the front portion 214 at a pivot point 218. The front portion 214 attaches to the trailer hitch 192 in the normal manner, and the coupling 216 allows the rear portion 212 to pivot in the vertical plane containing the composite member 210. Adjusting screws 220 threadedly engage the coupling 216. When both screws 220 are tight against the front portion 214, pivotal movement is precluded and the angle of inclination of the rear portion is determined by the adjustment of one screw 220 relative to the other. This offers the user an alternative means to adjust the height of the platform 150.

In yet a further variation, the upright bars 136 could be replaced by vertically oriented telescopic members similar to the inclined bars 138 for adjusting the height of the platform 150.

In yet one more variation, the support-frame 102 can be configured so that it can be attached to a vehicle through a plurality of attachment points, as in a three-point hitch to a tractor.

In even a further variation, the support frame 102, can be configured to include a special coupling device 230, illustrated in FIGS. 26, 27 and 28, for attaching it to a standard step-bumper of a pickup truck, instead of its being coupled to a Reese-type hitch. Such standard bumpers are well known in the art. In a preferred configuration of the device 230, the second end 108 of the longitudinal element 104 is welded atop an attachment plate 232 having a flat portion 234 and a flange 236 extending downwardly from the frontmost edge of the plate 232. The plate 230 is configured to conform with the stepped portion of the bumper. Fastening holes 238 in the flat portion 234 and the flange 236 are positioned to align with receiving holes provided in the standard bumper. Thus, the plate 232 can be bolted or otherwise fastened to the bumper.

The cold-roll steel support-frame 102 is typically spray-coated to provide a protective finish. The aluminum platform 150 may be anodized, optionally in a color the user may choose to match or complement the color of the vehicle.

The invention has been described in detail with particular reference to certain preferred embodiments thereof, but it will be understood that variations and modifications can be effected within the spirit and scope of the appended claims.

We claim:

1. A cargo carrier for a vehicle, comprising:
   (a) a support-frame which can be removably attached to a towing hitch on the vehicle;
   (b) a pair of spaced apart upright support bars extending to an adjustable distance above the support-frame;
   (c) a pair of spaced apart inclined support bars pivotally and removably attached to the support-frame and extending therefrom to an adjustable distance; and
   (d) a platform with a frame having lateral first and second frame members, ends of the upright and inclined bars distal from the support-frame being pivotally attached to the first and second frame members respectively;
   so that the platform can be secured at a selectable height and inclination by adjusting the distances that the upright and inclined bars extend from the support-frame.

2. The carrier of claim 1, the support-frame being T-shaped with a lateral element and a longitudinal element, the upright and inclined bars being connected to the lateral element; a first end of the longitudinal element being attached to the lateral element and a second end being removably attachable to the vehicle.

3. The carrier of claim 2, wherein the platform extends in the same general direction as the longitudinal element.

4. The carrier of claim 2, wherein the platform extends away from the general direction of the longitudinal element.

5. The carrier of claim 2, wherein the lateral element is removably attached to the longitudinal element in an orientation selectable from two opposed orientations.

6. The carrier of claim 1, wherein the inclined bars are telescopic.

7. The carrier of claim 1, the inclined bars being configurable so that when not attached to the support-frame they may be freely pivoted around the second frame member.

8. The carrier of claim 1, wherein the platform has opposed surfaces which are functionally equivalent.

9. The carrier of claim 1, wherein the platform comprises a plurality of spaced apart slats.

10. The carrier of claim 9, wherein the slats are longitudinal.

11. The carrier of claim 1, wherein the inclined bars are spaced apart from the longitudinal element by a greater distance than are the upright bars.

12. The carrier of claim 2, wherein the longitudinal element comprises front and rear portions joined at a coupling which permits the rear portion to be selectably inclined relative to the front portion.

13. The carrier of claim 1, including also a guard conforming to at least one edge of the platform.

14. The carrier of claim 13, wherein the guard is removable.

15. The carrier of claim 13, wherein the guard can include a plurality of separately removable portions.

16. The carrier of claim 15, wherein the removable portions may be secured one above another.

17. The carrier of claim 1, further comprising a ramp one end of which can be removably attached to the platform.

18. The carrier of claim 17, wherein an end of the ramp opposed to the platform end has downwardly extendable legs.

19. The carrier of claim 1, the support-frame being configured to be attachable to the vehicle at a plurality of points.

20. The carrier of claim 1, the support-frame having a device configured to be coupled to a standard vehicle bumper.

21. The carrier of claim 1, the support-frame having a device configured to be coupled to a step bumper of a pickup truck.

22. A method of assembling a cargo carrier for a vehicle, the carrier having a platform with lateral first and second frame members, upright bars being pivotally attached to the first frame member, and inclined bars being pivotally attached to the second frame member, the carrier further having a support-frame to which the upright bars can be attached and to which the inclined bars can be pivotally attached; the method comprising the steps of:

(a) attaching a longitudinal element of the support-frame to the vehicle (b) securing the upright bars to a lateral element of the support-frame, so that they extend upwardly therefrom to a selectable height;

(c) coupling the inclined bars to the lateral element so that they extend generally away from the longitudinal element; and (d) securing the inclined bars at a selectable length;

thus configuring the platform to extend from the upright bars at a selected inclination and in a general direction opposed to the longitudinal element.

23. A method of assembling a cargo carrier for a vehicle, the carrier having a platform with lateral first and second frame members, upright bars being pivotally attached to the first frame member, and inclined bars being pivotally attached to the second frame member, the carrier further having a support-frame to which the upright bars can be attached and to which the inclined bars can be pivotally attached; the method comprising the steps of:

(a) attaching a longitudinal element of the support-frame to the vehicle;

(b) securing the upright bars to a lateral element of the support-frame, so that they extend upwardly therefrom to a selectable height;

(c) coupling the inclined bars to the lateral element so that they extend in the same general direction as the longitudinal element; and (d) securing the inclined bars at a selectable length;

thus configuring the platform to extend from the upright bars at a selected inclination and in the same general direction as the longitudinal element.

24. The method of claim 22, comprising the further steps of:

(a) disengaging a lateral element of the support-frame from a longitudinal element of the support-frame to which it was previously secured;

(b) reversing the orientation of the lateral element relative to the longitudinal element; and (c) reengaging the lateral and longitudinal elements and securing them together;

thus securing the platform in a new orientation substantially opposed to its previous orientation.

25. The method of claim 22, comprising the further steps of (a) disengaging the inclined bars from the lateral element;

(b) configuring the inclined bars so that they do not extend as far as the first frame member;

(c) pivoting the platform about the first frame member until it extends from the upright bars in the same general direction as the longitudinal element;

(d) pivoting the inclined bars through the plane of the platform;

(e) securing the inclined bars to the lateral element so that they extend in the same general direction as the longitudinal element; and (f) reconfiguring the inclined bars to a selectable length and securing them thereat;

thus securing the platform in a new orientation substantially opposed to its previous orientation.

26. The method of claim 22, comprising the further steps of (a) disengaging the inclined bars from the lateral element;

(b) disengaging the upright bars from the lateral element;

(c) reversing the orientation of the lateral element so that, relative to the longitudinal element, each upright bar has a location opposed to its previous location;

(d) reengaging the upright bars and the lateral element; and (e) reengaging the inclined bars and the lateral element; thus securing the platform in a new orientation substantially opposed to its previous orientation.

27. A cargo carrier for a vehicle having a hitch, comprising:

(a) a longitudinal member having a first end and a second end, the first end capable of being coupled to the hitch;

(b) an elongated lateral member having first and second ends and joined to the second end of the longitudinal member between the first and second ends of the lateral member;

(c) at least one support member having a proximal end coupled to the lateral member and a translatable distal end; and (d) a platform coupled to the translatable distal end of the support member.

28. The cargo carrier of claim 27, the platform being pivotally coupled to the distal end of the support member.

29. A cargo carrier for a vehicle, comprising:

a support frame;

an elongate platform; and a pair of extendable upright members extending upwardly from the support-frame in a fixed direction, each upright member having an upper end pivotally connected to an edge of the platform.

30. The carrier of claim 29, comprising at least one extendible inclined member having a first end pivotally connected to the support-frame and a second end pivotally connected to a member of the platform spaced apart from the edge to which the upright members are attached.

31. A cargo carrier for a vehicle, comprising:

(a) a support-frame which can be removably attached to a towing hitch on the vehicle;

(b) at least one upright support bar extending to an adjustable distance above the support-frame;

(c) at least one inclined support bar pivotally and removably attached to the support-frame and extending therefrom to an adjustable distance; and (d) a platform with a frame having lateral first and second frame members, ends of the upright and inclined bars distal from the support-frame being pivotally attached to the first and second frame members respectively;

so that the platform can be secured at a selectable height and inclination by adjusting the distances that the upright and inclined bars extend from the support-frame.

\* \* \* \* \*